United States Patent [19]
Paolieri et al.

[11] 3,855,400
[45] Dec. 17, 1974

[54] PURIFICATION OF HYDROCHLORIC ACID

[75] Inventors: Roberto Paolieri, Youngstown; Todd A. Pitts, Snyder; James W. McCloskey, Buffalo, all of N.Y.

[73] Assignee: Hooker Chemicals & Plastics Corp., Niagara Falls, N.Y.

[22] Filed: Feb. 10, 1972

[21] Appl. No.: 225,221

[52] U.S. Cl.............. 423/488, 210/DIG. 5, 55/71, 55/196
[51] Int. Cl............................................. B01j 9/04
[58] Field of Search............ 55/85, 174, 52, 53, 71, 55/196, 74; 210/323, 23, 315, 335, 488, 500, DIG. 5; 23/312; 423/488, 500

[56] References Cited
UNITED STATES PATENTS

| | | | |
|---|---|---|---|
| 2,559,267 | 7/1971 | Winslow | 210/323 |
| 2,701,062 | 2/1955 | Robinson | 210/23 |
| 2,707,563 | 5/1955 | Kasten | 210/23 |
| 2,960,234 | 11/1960 | Fredrickson | 210/23 |
| 3,144,407 | 8/1964 | Olmos | 210/335 |
| 3,242,648 | 3/1966 | Young | 55/85 |
| 3,319,793 | 5/1967 | Miller | 210/323 |
| 3,506,409 | 4/1970 | Hutson | 23/312 R |
| 3,597,167 | 8/1971 | Marks | 423/488 |
| 3,675,776 | 7/1972 | Campo | 210/282 |

Primary Examiner—Wilbur L. Bascomb, Jr.
Assistant Examiner—Hiram H. Bernstein
Attorney, Agent, or Firm—Peter F. Casella; Donald C. Studley

[57] ABSTRACT

A process, and system for carrying out said process, for the purification of hydrochloric acid containing chlorine and organic impurities, has been devised wherein a crude aqueous hydrochloric acid is charged to a coalesing zone wherein the acid passes through a porous coalescing means whereby the insoluble organic impurities are coalesced and separated from the aqueous hydrochloric acid by gravity, and the partially purified aqueous hydrochloric acid fraction containing dissolved chlorine and soluble organic matter is charged to a stripping zone and simultaneously contacted therein with a stream of inert gas, e.g., air, to effect the removal of substantially all of the dissolved chlorine and soluble organic material from the aqueous hydrochloric acid. Purified hydrochloric acid is recovered from the stripping zone. Chlorine gas removed from the hydrochloric acid may be recovered from the inert gas stream and reused.

14 Claims, 2 Drawing Figures

PURIFICATION OF HYDROCHLORIC ACID

FIELD OF INVENTION

This invention relates to a process, and systems for carrying out the process, of purifying hydrochloric acid. More particularly it relates to a continuous process for removing dissolved chlorine and soluble and insoluble organic materials from aqueous hydrochloric acid.

BACKGROUND OF INVENTION

The direct chlorination of many organic substances, both aliphatic and aromatic, is widely practiced throughout the chemical industry. In such processes hydrocarbons such as ethane, propane, kerosene, benzene, toluene, xylene and the like, are reacted with chlorine to produce a wide variety of chlorinated organic substances and, as a by product, hydrogen chloride. The latter may be absorbed in water to form hydrochloric acid. Necessarily this by product is contaminated with unreacted chlorine and organic impurities consisting of hydrocarbon, and chlorinated hydrocarbon materials which are contained in the off gases emanating from the chlorination process. The off gases, consisting essentially of hydrogen chloride together with chlorine and organic materials are conventionally passed through a scrubber charged with water wherein the hydrogen chloride is dissolved in water together with some of the chlorine. The organic material is in part dissolved and in part emulsified in the scrubber liquor. The crude hydrochloric acid obtained requires purification before it can be used or sold in commerce. Various techniques have been used to purify this crude aqueous hydrochloric acid such as stripping or desorbing with inert gases, solvent extraction or adsorption with solid adsorbers. However such prior procedures have not been completely successful. For example when stripping or desorbing techniques are attempted, there is a simultaneous loss of significant amounts of hydrogen chloride and consequently the acid value of the aqueous hydrochloric acid is reduced. Similarly, when adsorption techniques are used in the presence of substantial quantities of chlorine and/or higher molecular weight organic material, the effectiveness and useful life of the adsorbent is greatly shortened.

It has been proposed, in United States Patent No. 3,597,167, to purify contaminated hydrochloric acid by charging the contaminated acid to a stripping zone, simultaneously charging a stream of inert gas to said zone to effect the removal of substantially all of the chlorine from the acid and passing the stripped acid through a bed of finely divided solid contacting material to coalesce and effect removal of insoluble organic material dispersed in the stripped acid and then to an adsorption zone wherein the acid is contacted with a solid adsorbent to remove residual organic material from the stripped hydrochloric acid. This procedure is only partially effective since as indicated in this patent, the purified acid obtained contains appreciable, i.e., more than 120 parts per million of both chlorine and organic material. Further the use of a solid adsorbent material, e.g., silica and activated carbon to coalesce and to adsorb organic material has the aforementioned objection of relatively short useful life of the solid adsorbent.

OBJECTS OF THE INVENTION

It is therefore a principal object of the present invention to devise an effective process for the purification of hydrochloric acid contaminated with both chlorine and organic materials.

Another object is to devise a process for effectively removing both organic material and chlorine from concentrated aqueous hydrochloric acid which does not utilize a solid adsorbent.

It is an ancillary object to devise an effective system for purifying crude hydrochloric acid wherein the product is obtained as a water white product and contains minimal, or very low, quantities of chlorine and organic materials.

These and other objects and advantages of the present invention will be apparent from the following description thereof.

SUMMARY OF INVENTION

In accordance with the process of the present invention crude aqueous hydrochloric acid containing chlorine and organic material as impurities is charged to a coalescing zone wherein insoluble organic material is coalesced and there is formed a partially purified aqueous hydrochloric acid fraction and an organic material fraction, the latter fraction being separable from the former fraction, thereafter passing said partially purified aqueous hydrochloric acid fraction from said coalescing zone into a stripping zone and contacting said hydrochloric acid fraction with a stream of inert gas to effect the desorption of substantially all of the chlorine and soluble organic material and recovering purified hydrochloric acid as the liquid effluent from said stripping zone. By such a process, hydrochloric acid of water white color and containing less than about 15 ppm of chlorine and less than about 5 ppm of organic material can be obtained in a rapid and economical fashion. The process can be operated in a continuous fashion for periods of about one month or longer before cleaning and/or replacement of the coalescing means may be required.

The process of the present invention is conveniently carried out in an apparatus or system which comprises a coalescer and a stripper connected thereto. The coalescer comprises a vessel provided with an inlet for the crude hydrochloric acid and an outlet for discharging partially purified aqueous hydrochloric acid from the coalescer. A porous coalescing means is horizontally disposed with said coalescer between said inlet and said outlet, said coalescing means being being disposed so as to form two separate compartments within said coalescer whereby flow of liquid though the coalescer is restricted to liquid flowing through the coalescing means. The coalescer also includes a discharge port disposed in the lower portion thereof at a point downstream from the coalescing means for removal of coalesced insoluble organic material.

The stripper, which is connected by suitable liquid delivery means to the outlet of the coalescer comprises a vertical column having an inlet for partially purified hydrochloric acid in the upper portion thereof and outlet for purified hydrochloric acid in the lower portion thereof. An inert gas inlet is disposed in the stripper in the lower portion thereof and a outlet for exiting inert gas containing desorbed chlorine and soluble organic material is disposed in the upper portion of said stripper. The several inlets and outlets are thus positioned in the column so that the acid feed stream and the inert gas pass through the column in counter-current contact with each other and thereby the dissolved chlorine and soluble organic material are stripped from the acid stream as it flows down the column. The stripper, preferably, is packed with suitable contacting elements to provide a large surface area and to obtain ample liquid-gas contact.

DETAILED DESCRIPTION OF THE INVENTION

Figure 1:
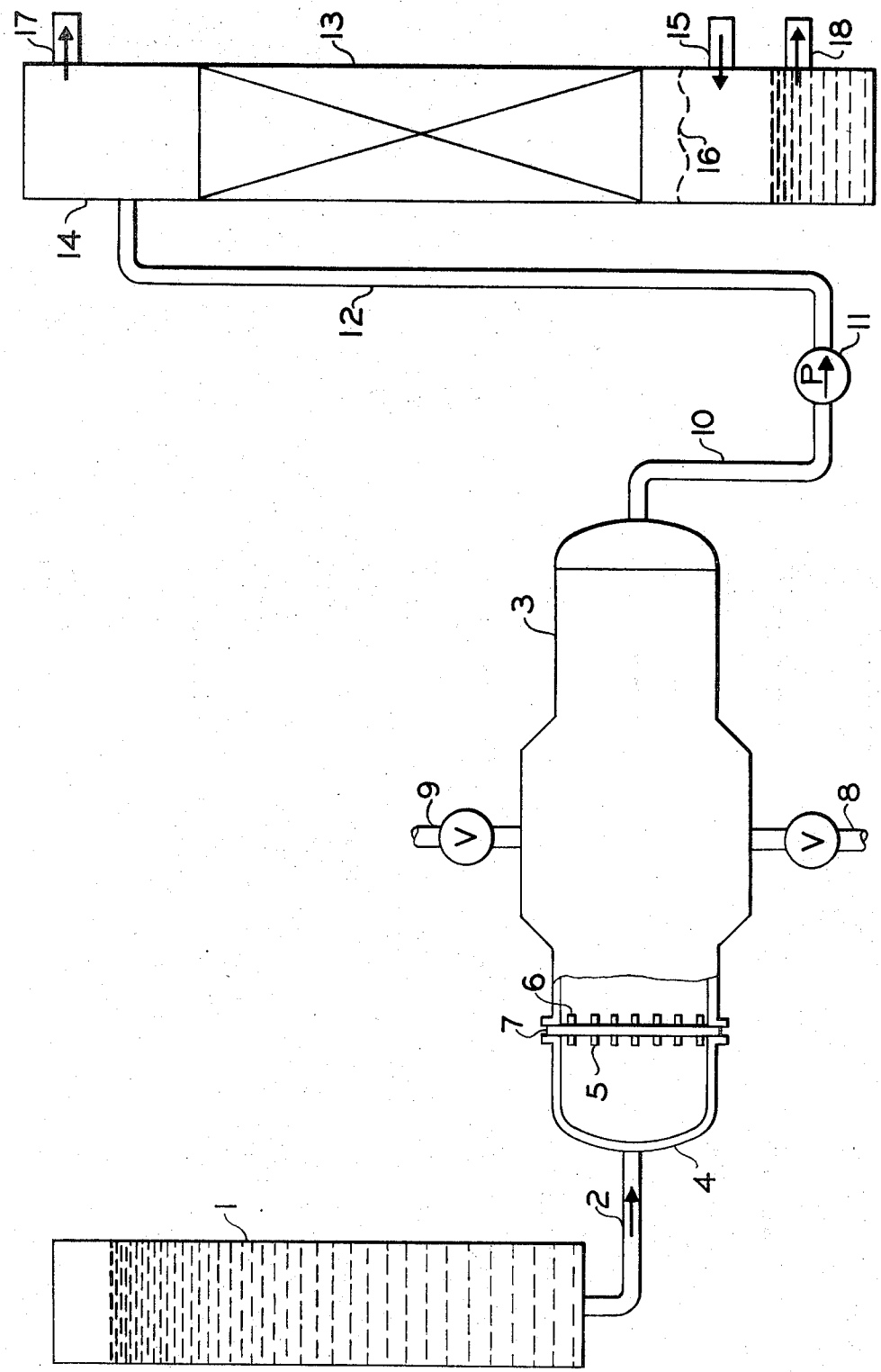
Figure 2:
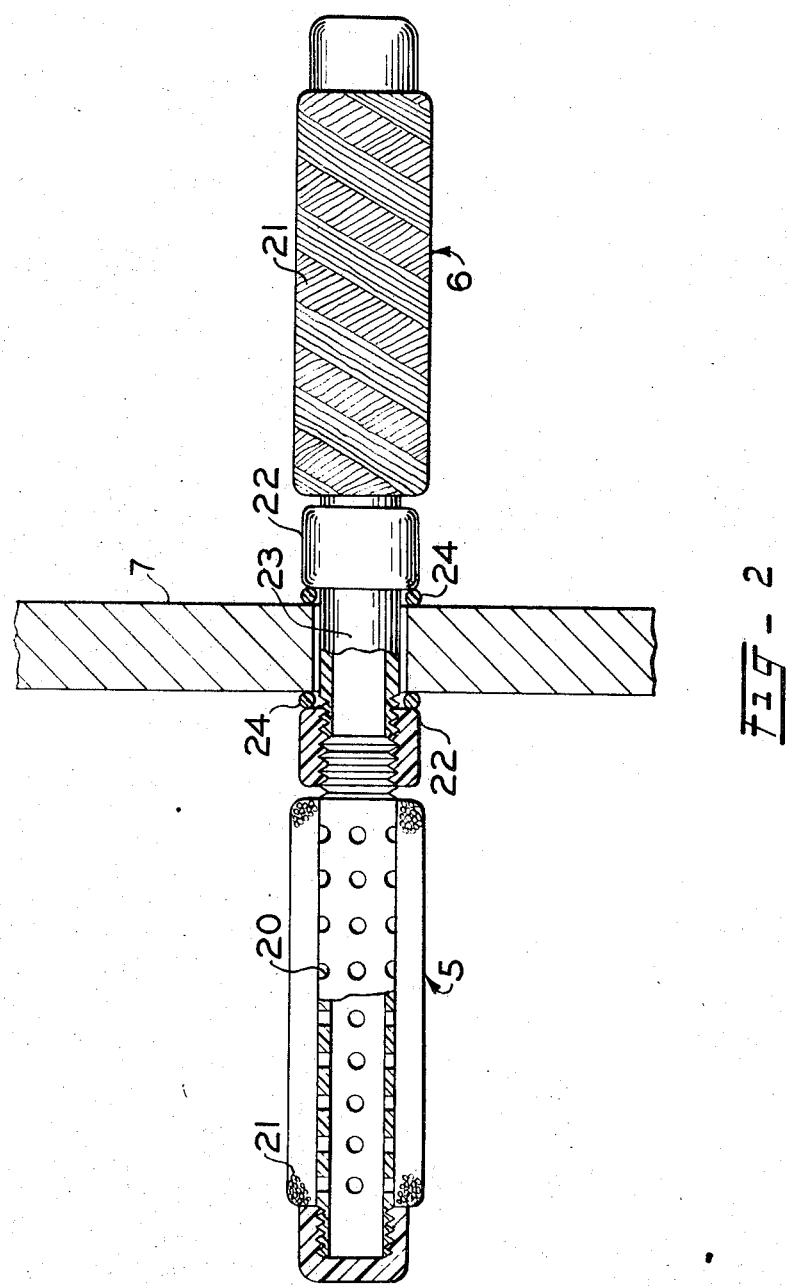

In order that the present invention may be more readily understood, it will be described with reference to the attached drawings which illustrate a preferred system in which to carry
out the process of the present invention.
In these drawings,
FIG. 1 represents the system of apparatus and serves also as a flow sheet of the process, and
FIG. 2 represents an arrangement of one of the coalescing units comprising the preferred coalescing means.

In a preferred embodiment of the process of the invention an acid feed stream of crude aqueous hydrochloric acid containing insoluble organic material suspended therein and chlorine and organic material dissolved therein from a suitable reservoir or stand pipe, 1, is charged through line 2, which may contain a pumping means and/or screening means (not shown) to remove large solid particulate material, into the coalescer 3 at inlet, 4. The acid feed stream is typically a crude aqueous hydrochloric acid of about 19° to 22° Be containing from about 1,500 to about 5,000 ppm of chlorine dissolved therein, and about 50 to 250 ppm or more of organic material both insoluble and soluble, such as is derived by desorbing the off gases from an organic chlorination process. The composition of the organic impurities will, of course, vary depending upon the particular chlorination process producing the hydrogen chloride off gas fed to the desorber. In general, the crude acid will contain organic material, both chlorinated and unchlorinated having from one to seven or more carbon atoms and may be aliphatic or aromatic or both in character. The crude acid feed stream passes into the upstream side of a series of coalescing units, attached to a tube sheet, 7, and passes out the downstream side of the coalescing units, 6, into the decanting zone of the coalescer, 3. In passing into the coalescing unit, 5, the crude acid feed is filtered, removing solid material. The suspended small droplets of insoluble organic material is coalesced into larger droplets by passing into and out of the coalescing units, 5, and 6. The larger coalesced droplets of insoluble organic material readily separate by gravity from the aqueous acid stream forming a separate organic phase which gradually collects in the lower portion of the coalescer, 3, from which it may be periodically or continuously withdrawn through discharge valve, 8, by gravity flow. Coalesced insoluble organic material of lesser specific gravity than the partially purified aqueous acid, if and when present, separates therefrom as a separate fraction and rises to the top of the coalescer and may be periodically or continuously skimmed off by mild suction, through discharge valve, 9. The aqueous acid fraction, substantially free of insoluble organic material passes out of the coalescer, 3, through pipe, 10, to pumping means, 11, and then through pipe 12 into stripper, 13, through acid inlet 14. The aqueous acid stream flows downwardly through the stripper and is simultaneously contacted therein with a counter current stream of air or other inert gas, admitted through inlet, 15, into stripper 13, flowing through a gas distributor plate, 16. The ascending stream of air passing through the descending stream of aqueous acid desorbs dissolved chlorine and soluble organic material and the gas stream containing the desorbed chlorine and soluble organic material exits from the stripper through outlet, 17. The stripped aqueous hydrochloric acid descends through the stripper collecting in the bottom section thereof and flows out of the stripper through acid outlet, 18. to suitable storage area. The stripper preferably contains solid contact elements, such as 1 inch ceramic saddles, glass rings, or the like to increase contact of the aqueous acid and the air stream. when in use the stripper is filled to at least about 50 percent of its height and preferably at least about 70 percent of its height with such contact elements, preferably in a fixed bed.

The coalescing units comprise a bank of identical units mounted horizontally on a acid resistant tube sheet which extends from the top to the bottom of the coalescer, 3, forming two separate compartments within the coalescer. One such coalescing unit is shown in detail in FIG. 2. As indicated thereon each coalescing unit consists of two sections of acid resistant pipe mounted on the supporting tube sheet 7, and enclosed at one end remote from tube sheet, 7. Each of sections 5 and 6 which may be the same or different size, are perforated around the entire circumference thereof with a series of holes, 20. The pipe sections, 5 and 6, are covered with several layers of woven fabric or wound filaments or yarn, 21, for example fiber glass, to provide a porous covering for the perforated pipe section and to provide a porosity of from 1 to about 15 microns. By "porosity of 15 microns" is intended to signify that particles of 15 microns or larger in size will be rejected or will not pass through the covering. The pipe sections mounted on the upstream side of the tube sheet, that is the section into which the acid feed flows into and through to the pipe section on the opposite side of the tube sheet are termed the "filter element." Similarly the pipe sections mounted on the downstream side of the tube sheet, that is the section through which and out of which the acid feed flows, are termed the "coalescing elements." In general, the filter elements are of a porosity equal to or coarser than the coalescing elements.

Thus the coalescing units comprise two similar hollow units each mounted on oppostie sides of the tube sheet. A bank of such units are mounted horizontally on the tube sheet the so-called "filter elements" being mounted on the upstream side of the tube sheet, and the so-called "coalescing elements" being mounted on the downstream side of the tube sheet. Each of these elements are substantially identical in construction and are formed of acid resistant metal or plastic pipe sections of from about 1 to 6 inches, in diameter preferably from about 1.5 to about 3 inches, and about 5 to 30, preferably about 10 to 14 inches in length. The pipe is perforated with holes of about ⅛ to ½ inch in diameter, preferably ¼ inch, to provide a total free hole area of from about 0.05 to 0.5 ft$^2$ free hole area and preferably from about 0.075 to 0.20 ft$^2$ free hole area. Each pipe section is enclosed at one end and threaded of the opposite end for attachment to the tube sheet. The pipes are covered and preferably are wound, with an acid resistant fibrous material, 21, such as fiber glass yarn, the winding covering the perforations 20 in the pipe. Several layers of the winding are applied to a sufficient degree of tightness, hence porosity, to obtain a porosity of from one to 15 microns. The filter elements are preferably wound to a porosity equal to or coarser than the porosity of the coalescing elements. The elements are conveniently attached to the tube sheet by means of threaded couplings, 22, which in turn are attached to threaded nipples, 23, extending through holes in the tube sheet and are sealed against the face of the tube sheet by means of O-rings, 24. Preferably several layers of the winding are applied and in such a manner that the winding becomes progressively tighter from the outside in toward the pipe core. This preferred manner of applying the winding enables the coarser solids in the feed stream to be retained in the outer looser windings of the filter element thereby increasing the solids capacity of the filter element. Further, this same preferred character of the winding on the coalescing elements, where the liquid flow is from the inside enhances coalesence by forcing the smaller droplets together and the larger droplets to fall off of the outside of the element. By this preferred arrangement the crude acid entering the coalescer flows through the pourous winding of the filter element, whereby solid materials are filtered from the acid feed stream, and the filtered acid passes through the interior of the filter section into the interior of the coalescing section and out of the latter through the porous winding thereof. In passing into and out of the porous coalescing units, the small droplets of suspended organic material are coalesced and readily separated by gravity from the aqueous acid feed.

Thus, the crude aqueous hydrochloric acid feed containing suspended therein droplets of insoluble organic material and dissolved therein chlorine and soluble organic material and which may contain solid particles of inorganic chlorination catalysts and chlorinated organics flows by gravity or is pumped under sufficient pressure to overcome the pressure drop across the coalescing elements into the coalescer which serves to contain the bank of coalescing units and to provide sufficient space to permit the stratification of the coalesced organic material and the aqueous hydrochloric acid. The coalescer, which is constructed of acid resistant material preferably contains expanded sections suitably located in the mid section thereof downstream from the bank of coalescing units for collection of the organic fractions. Discharge ports are placed in these expanded sections to permit removal of the organic fractions. The coalescer, is of such size as to permit a residence time for the aqueous hydrochloric acid feed of from about 10 to about 160 minutes and preferably about 30 to about 120 minutes.

The coalescing units, each comprising a filter section and a coalescing section, are mounted horizontally on an acid resistant tube sheet, such as glass lined steel, or acid resistant plastic. The tube sheet extending from the top to the bottom of the coalescer is provided with a series of holes which serve to mount the filter elements on the upstream side of the tube sheet and the coalescing units on the downstream side of the tube sheet. The acid feed flows through the porous covering or winding and into the filter section, whereby solid material is removed from the acid feed, and through the interior of the filter section through the tube sheet then through the interior and out of a coalescing section, through the porous covering or winding thereon, whereby the smaller droplets of the suspended organic material are comingled and coalesced into larger droplets. The acid feed containing the coalesced organic material emanating from the coalescing units passes through the coalescer, the heavier coalesced organic material separating from the aqueous acid and collecting in the expanded lower section of the coalescer. Similarly the lighter coalesced organic material separates from the aqueous acid and collects in the expanded upper section of the coalescer. The coalescer may be operated over a wide range of conditions. In general the temperature may vary from about 0° centigrade to about 90° centigrade.

The partially purified acid feed stream substantially free of solids and insoluble organic material flows from the coalescer and is directed by gravity flow or is pumped to the stripper. The acid is admitted to the stripper at a point in the upper section thereof and flows down through the stripper wherein the descending acid stream is contacted with an ascending inert gas stream admitted to the stripper at a point in the lower section thereof. The stripper preferably is packed with suitable contacting materials such as ceramic or porcelain Raschig rings or Berl saddles. By contacting the descending acid stream with the ascending inert gas stream the dissolved chlorine and soluble organic material is removed i.e., desorbed, from the acid and the gas stream containing the desorbed chlorine and organic material is exited from the stripper. The purified acid collects in the bottom of the stripper and is discharged therefrom through a suitable overflow pipe to storage.

The stripper unit is a vertical column or tower of conventional design for effecting continuous contacting of liquids and gases in counter-current flow. It should, of course, be constructed of acid resistant materials, such as rubber lined metals, glassed steel, acid resistant plastics, and the like. The inert gas stream, which is admitted to the stripper in the lower section thereof, is preferably pumped under pressure through a conventional gas distributor or sparging device so as to break up the gas stream into a plurality of gas streams which, together with the contacting elements, provides a high degree of contact between the inert gas and acid.

The stripper can be operated over a wide range of conditions. In general the temperature at atmospheric pressure can vary from about 0° to about 90° centigrade. Preferably the temperature is maintained at from about 10° to about 35° centigrade in order that the desorption of hydrogen chloride may be minimized with the resultant reduction of the acid concentration of the purified acid product. It has been found that under normal operating conditions the desorption of hydrogen chloride is generally less than about 0.5 percent in concentration by weight. The relative ratio of inert gas flow and acid feed charged to the stripper are important for the efficient desorption of chlorine and soluble organic material from the acid feed. Although the relative ratio of inert gas and acid feed per unit time charged to the stripper can be varied over a considerable range, the optimum ratio employed depends upon such factors as the volume of acid charged, the diameter of the stripper, the amount and type of solid contacting material used, the amount and type or organic material being removed, the temperature at which the stripper is operated and the volume of inert gas used. Generally the ratio per unit time of inert gas to acid charged is within the range of from about one to about 20 cubic feet of inert gas (measured at standard conditions) per gallon of acid feed. Preferably this ratio is within the range of from about 5 to about 10 cubic feet of inert gas per gallon of acid feed. The inert gas used may be air, nitrogen, carbon dioxide and the like. Air, because of its availability and relative low cost is preferred.

The residence time of inert gas and acid feed within the stripper is that period required to effectively desorb substantially completely the chlorine and soluble organic impurities in the acid feed. This time will vary depending upon the quantity of chlorine, the amount and nature of the soluble organic material in the acid feed, the ratio of inlet gas to acid charged, the temperature of the acid feed, the efficiency of the solid contacting material and the size of the ascending inert gas streams. Generally the acid feed is charged at a rate sufficient to wet the contact elements without flooding the column.

The exit gas stream emanating from the top of the stripper should be treated to recover chlorine and organic values prior to venting to the atmosphere or recycling the gas to the stripper.

The purified acid discharged from the stripper is a high quality concentrated hydrochloric acid. The acid strength approaches 36 percent by weight hydrochloric acid, and contains only trace amounts, less than 15 ppm of chlorine and less than 5 ppm of organic material. It is generally water white in color and when prepared under optimum conditions is suitable for use as a "CP-Grade" hydrochloric acid.

The following examples will illustrate the process of the present invention but they are not intended to limit the process to the particular procedure or specific details illustrated therein.

EXAMPLE 1.

A stream of crude hydrochloric acid of 20.5° Be strength, at 35° centigrade was charged to a coalescer of about 2,300 gallons capacity and containing therein a bank of coalescing units having a porosity of about 5 microns. The crude acid contained about 5,400 ppm of chlorine and about 1,600 ppm of insoluble and soluble organic material. The crude acid was a dark yellow emulsion and flowed into the coalescer at the rate of 60 gallons per minute at about 9 psi. The residence time of the crude acid in the coalescer was about 40 minutes.

The crude acid flowed through the coalescing units whereby the insoluble organic material was coalesced and separated by gravity from the aqueous acid and was periodically discharged from the coalescer through the outlet in the bottom of the coalescer located downstream from the bank of coalescing units.

The aqueous acid fraction, substantially free of insoluble organic material flowed from the coalescer as a clear dark yellow solution containing about 800 ppm of soluble organic material.

The acid fraction was mixed with purified acid recycled from the bottom of the stripper and the mixture, containing about 1,350 ppm of chlorine and about 200 ppm of organic material was charged at the rate of about 80 gallons per minute to the top of the stripper.

The stripper was a vertical column of about 54 feet in height and 22 inches in diameter and was filled with a fixed bed of 1 inch ceramic interlox saddles, the bed occupying about 39 feet of the stripper. A current of air flowing at the rate of 1,000 lbs. per hour was admitted at the bottom of the stripper and flowed through a gas distribution plate counter current to the descending acid stream.

Purified acid was discharged from the stripper and was found to be a clear white 20.3° Be hydrochloric acid containing about 10 ppm of chlorine and <5 ppm organic material. The stripper temperature was about 30° centigrade.

The exit gas stream vented from the top of the stripper was passed through a continuous water scrubber to remove hydrogen chloride and a portion of the chlorine contained therein and the washed gas stream was passed through an aqueous caustic soda solution to converted residual chlorine to sodium hypochlorite. The waste gas stream was vented to the atmosphere.

EXAMPLE 2

In order to demonstrate the efficiency of the coalescing units as a means for breaking acid emulsions, a stream of an acid mixture, containing about 4,500 ppm of perchloroethylene and orthochlorotoluene in 32 percent by weight muriatic acid was passed at the rate of about 2.5 gallons per minute through a single coalescing unit having a porosity of 5 microns. The acid fraction flowing from the coalescer was clear and water white and contained about 450 ppm of soluble organic material.

What is claimed is:

1. A system for the purification of crude aqueous hydrochloric acid containing insoluble organic material suspended therein and chlorine and soluble organic material dissolved therein comprising a coalescer and a stripper:

said coalescer comprising a vessel provided with an inlet for said crude hydrochloric acid and an outlet for partially purified hydrochloric acid, a porous coalescing means disposed in horizontal arrangement within said coalescer between said inlet and said outlet said coalescing means consisting essentially of a bank of coalescing units each consisting of a filter element and a coalescing element attached on opposite sides of a solid tube sheet said elements being of substantially identical design and comprising a perforated pipe section the perforations of which being covered with a porous winding of acid resistant material, said coalescing means being disposed so as to form two separate compartments within said coalescer whereby all the liquid introduced into the coalescer passes through the coalescing means before exiting from the coalescer, a discharge port disposed in the coalescer in the lower portion thereof at a point downstream from said coalescing means for discharge of coalesced organic material;

said stripper comprising a vertical column having an inlet for partially purified hydrochloric acid in the upper portion thereof and an outlet in the lower portion thereof for discharging purified hydrochloric acid, an inlet in the lower portion of the stripper for admitting inert gas and an outlet in the upper portion of the stripper for exiting inert gas containing desorbed chlorine and soluble organic material;

and means for conveying partially purified hydrochloric acid from the outlet of the coalescer to the inlet in the upper portion of the stripper.

2. The system as claimed in claim 1, wherein the winding has a porosity of from about one micron to about 15 microns.

3. The system as claimed in claim 1 wherein the winding consists of several layers of glass fiber yarn.

4. The system as claimed in claim 3, wherein the winding consists of several layers of glass fiber yarn, the layers being wound progressively tighter from the outside to the core of the perforated pipe.

5. The system as claimed in claim 1, wherein the coalescer is provided with a discharge port in the upper portion thereof at a point downstream from the coalescing means for discharge of coalesced organic material of lesser specific gravity than the partially purified hydrochloric acid.

6. The system as claimed in claim 1, wherein the stripper contains a fixed bed of solid contact elements filling at least about 50 percent of the space in said stripper.

7. The system as claimed in claim 6, wherein said contact elements occupy about 70 percent of the space in said stripper.

8. A process for the purification of hydrochloric acid containing chlorine and organic material which comprises charging crude hydrochloric acid to a coalescing zone wherein the acid passes through porous coalescing means wherein insoluble organic material suspended therein is coalesced and separated by gravity from the crude hydrochloric acid thereby forming an insoluble organic fraction and a partially purified hydrochloric acid fraction, said partially purified hydrochloric acid fraction containing dissolved therein chlorine and soluble organic constituents; passing said partially purified hydrochloric acid fraction into a stripping zone and simultaneously contacting said hydrochloric acid fraction with a stream of inert gas to effect the desorptive removal of substantially all of the dissolved chlorine and soluble organic material from the hydrochloric acid and recovering the acid effluent from the stripping zone substantially free of both chlorine and organic material.

9. The process as claimed in claim 8, wherein the inert gas is air.

10. The process as claimed in claimed 8, wherein the partially puriified hydrochloric acid passes through the stripper in descending flow and is contacted therein with as ascending stream of inert gas.

11. The process as claimed in claim 10 wherein the inert gas is air.

12. The process as claimed in claim 8 wherein the partially purified acid flows through the stripping zone in descending flow at a temperature of from about 0° to about 90° centrigrade and is contacted therein with an ascending stream of air.

13. The process of claim 8, wherein the crude acid feed stream passes through the coalescer at a rate such as to provide a residence time therein of from about 10 to about 160 minutes.

14. The process of claim 10, wherein the crude acid feed stream passes through the coalescer at a rate such as to provide a residence time therein of from about 30 to about 150 minutes.

* * * * *